United States Patent [19]
Trombert

[11] Patent Number: 4,516,842
[45] Date of Patent: May 14, 1985

[54] APERTURE WHEEL

[76] Inventor: John F. Trombert, 8 Old Summer St., Medway, Mass. 02054

[21] Appl. No.: 490,436

[22] Filed: May 2, 1983

[51] Int. Cl.³ ............................................. G03B 41/00
[52] U.S. Cl. .......................................... 354/4; 354/15; 354/293
[58] Field of Search ...................... 354/4, 5, 12, 13, 14, 354/15, 16, 17, 18, 19, 293, 292

[56] References Cited

U.S. PATENT DOCUMENTS

| | | | |
|---|---|---|---|
| 3,011,421 | 12/1961 | Sausele | 354/292 |
| 3,089,402 | 5/1963 | Sausele | 354/292 |
| 3,330,182 | 7/1967 | Gerber et al. | 354/4 |
| 3,641,885 | 2/1972 | Hill | 354/4 |
| 3,748,977 | 7/1973 | Mrozek | 354/292 |
| 3,821,770 | 6/1974 | Rosenstein et al. | 354/292 |
| 3,916,422 | 10/1975 | Heidenreich | 354/19 |
| 4,051,488 | 9/1977 | Tidd | 354/13 |

Primary Examiner—Russell E. Adams
Attorney, Agent, or Firm—Irving M. Kriegsman

[57] ABSTRACT

An aperture wheel having a circular base assembly which is adapted to be mounted for rotation about its central axis and a circular disc assembly which is removably and concentrically mounted on the base assembly is disclosed. The base assembly includes a circular frame having a central aperture and plurality of circumaxially spaced openings. A plurality of indexing pins are fixedly mounted on the frame for indexing the angular position of the frame, each indexing pin being associated with and precisely located relative to one of the circumaxially spaced openings. The disc assembly includes a circular plate having a central aperture and a plurality of circumaxially spaced openings, the openings being arranged so that they can be brought into registration with the openings on the frame when the disc assembly is mounted thereto. Means are provided for fixing the plate on the frame at either one of two angular positions and means are provided for holding the disc assembly so that it can be placed onto the frame and/or removed from the frame. In using the aperture wheel, a plurality of aperture plates and/or filter plates are mounted on the plate over the spaced openings using the two mounting pins located at each opening and secured in place by fasteners which are fastened onto the mounting pins. The loaded disc assembly is then placed on the frame and rotated to the desired angular position. Preferably, a plurality of discs assemblies may be provided, each loaded with a plurality of aperture plates and/or filter plates and each used separately as required with a single base assembly.

20 Claims, 9 Drawing Figures

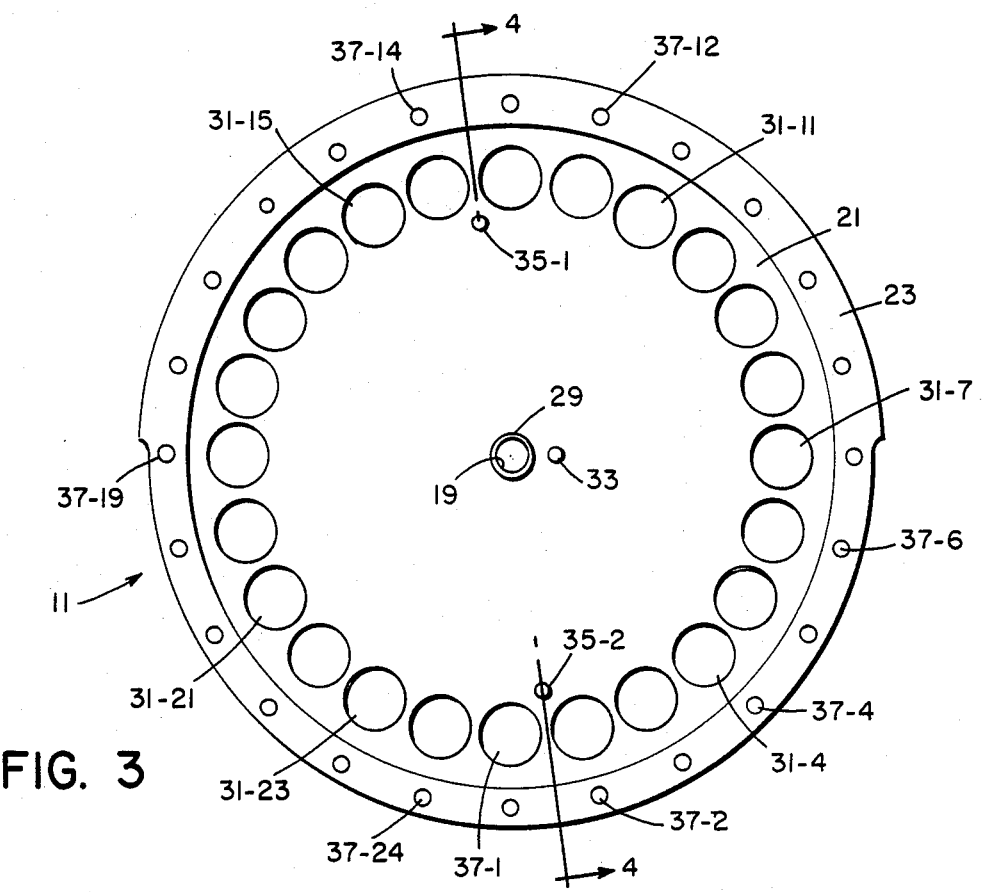
FIG. 3
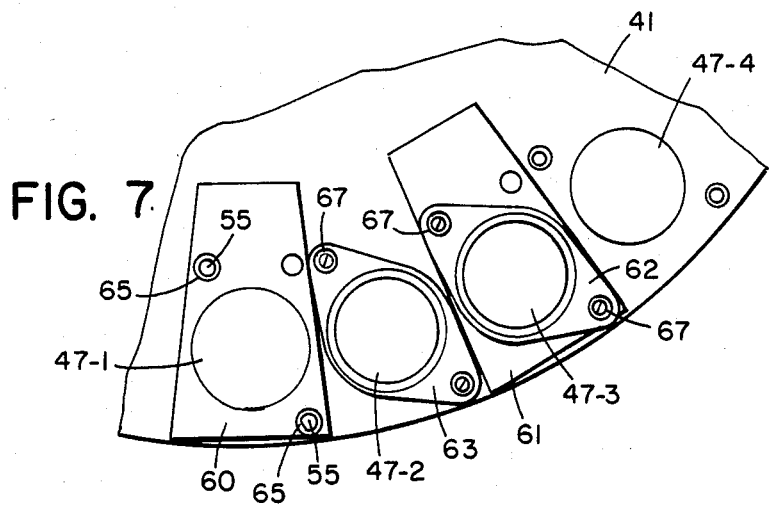
FIG. 7
FIG. 9
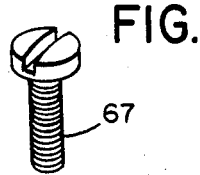
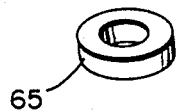
FIG. 8

APERTURE WHEEL

BACKGROUND OF THE INVENTION

The present invention relates generally to photoplotting machines in which a photosensitive surface such as a sheet or strip of photographic film is exposed to a moving light beam and more particularly to aperture wheels for use in such machines for selectively varying the characteristics of the moving light beam.

Aperture wheels for use in photoplotting machines for selectively varying the characteristics, such as the cross-sectional size and/or shape of a moving light beam are well known in the art.

An example of such a wheel and a machines in which such a wheel is used may be found in U.S. Pat. No. 3,330,182, which patent is incorporated herein by reference. Other examples of such wheels and machines may be found in U.S. Pat. No. 3,548,713 and U.S. Pat. No. 3,610,119.

In the past, these wheels have comprised a generally circular frame which is adapted to be supported on a vertical shaft for rotation about its central axis and having thereon a plurality, such as twenty-four, of circumaxially shaped openings. An aperture plate is removably secured to the frame over each one of the openings by means of two locating pins which are precisely located relative to each opening so that the aperture plate will be accurately positioned over the opening and two screws which engage a pair of holes formed adjacent to each opening. To obtain precise angular indexing of the wheel so that the individual aperture plates may be selectively positioned accurately in axial alighment with the light beam a plurality of locating pins are mounted on the frame, each pin being precisely located relative to one of the circumaxially spaced openings. In using these wheels, the aperture plates are first loaded onto the frame. After loading, the frame is mounted on the machines. After a particular job has been completed, the wheel is removed from the frame and the aperture plates removed from the frame. A new set of aperture plates are then mounted on the frame or the same set of apertures but arranged in a different order are mounted on the frame for the next job. As can be appreciated, during the time interval that the aperture plates are being changed, the machine cannot be used. In order to avoid this time delay, it has become a practice in some instances to provide a plurality of wheels for use with one machine, each wheel being loaded with a different or differently arranged set of aperture plates to meet the requirements of a particular job. The problem with this approach is that because of the extensive machinery required in fabricating the wheels, the cost of the individual wheels is rather expensive.

Accordingly, the need exists for a new and improved aperture wheel for use in a photoplotting machines, especially in applications where the aperture plates must be repeatedly changed.

SUMMARY OF THE INVENTION

An aperture wheel constructed according to the teachings of the present invention comprises an aperture wheel for use in selectively varying the characteristics of a beam of light, said aperture wheel comprising a circular frame adapted to be supported for rotation about its central axis, said frame having a plurality of circumaxially spaced openings, a plurality of indexing pins mounted on said frame for use in indexing the angular position of said frame, each pin being associated with and precisely located with respect to one of said openings, a circular disc seated on said frame member in axial alignment therewith said disc having a plurality of circumaxially spaced openings, said openings being positioned thereon so that they may be brought into registration with said circumaxially spaced openings on said frame, means for fixing the angular position of said disc relative to said frame, and means on said disc for use in mounting thereon a plurality of aperture plates, one over each of said circumaxially spaced openings.

According to one feature of the invention an aperture wheel is provided in which the aperture plates and/or filter plates to be carried thereon are mounted on a circular plate which in turn is removably mounted on a circular frame. The circular frame is a precisely machined body of material and includes indexing pins which are precisely located thereon to provide precise indexing of the frame. The circular plate, on the other hand is made from a sheet of flat stock requiring a minimum of machinery.

The foregoing and other objects and advantages will appear from the description to follow. In the description, reference is made to the accompanying drawing which forms a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawing in which like reference numerals or characters represent like parts:

FIG. 3 is a plan view of the base assembly in the aperture wheel shown in FIG. 1;

FIG. 7 is a plan view of a portion of the aperture wheel shown in FIG. 1 with a plurality of aperture plates and filter plates mounted thereon;

FIG. 8 is a perspective view of one of the mounting fasteners shown in FIG. 7 and somewhat enlarged; and FIG. 9 is a perspective view of one of the mounting screws shown in FIG. 7 and somewhat enlarged.

DETAILED DESCRIPTION OF A PREFERRED EMBODIMENT

Figure 1:
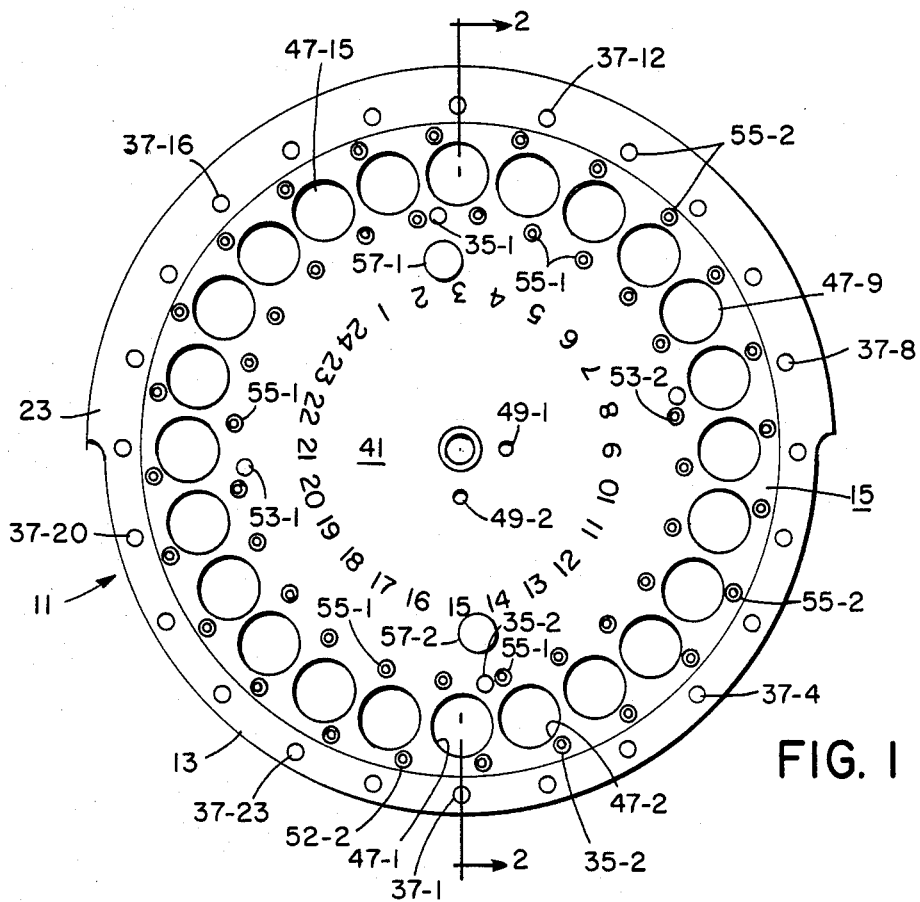
FIG. 1 is a plan view of an aperture wheel constructed according to the teachings of the present invention.
Figure 2:
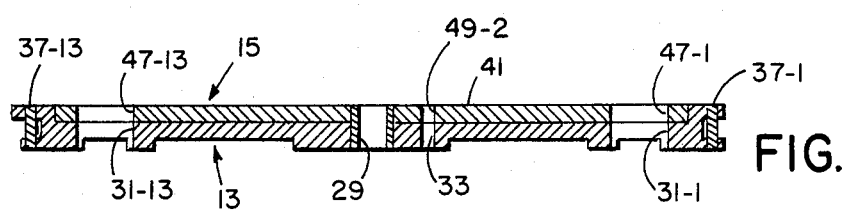
FIG. 2 is a section view taken along lines 2—2 in FIG. 1.

Referring now to the drawings, there is illustrated in FIGS. 1 and 2 an embodiment of an aperture wheel constructed according to the teachings of the present invention and identified generally by reference numeral 11. Aperture wheel 11 includes a base assembly 13 and a disc assembly 15.

Figure 4:
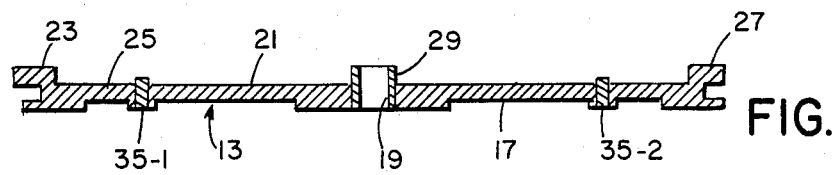
FIG. 4 is a section view of the base assembly taken along lines 4—4 in FIG. 3.

Base assembly 13, which is also shown in FIGS. 3, 4 and 7 includes a solid, generally circular frame 17 made of aluminum or other suitable material. Frame 17 is provided with a central aperture 19, for use in mounting the base assembly 13 on a shaft (not shown) for rotation about its central axis and includes an inner annular portion 21 and an outer annular portion 23. The top surface 25 of the inner annular portion 21 is flat and is recessed down from the top surface 27 of the outer annular portion 23. A bushing 29 is fixedly mounted in the central aperture 19. The inner annular portion 21 of frame 17 is provided with a plurality of circumaxially spaced openings labelled 31-1 through 31-24, the particular number of openings shown being for illustrative purposes only. A small locating hole 33 is also provided on the inner annular portion 21 of frame 17 near the center for use in properly locating the angular position of frame 17 when it is placed in a machine in which it is to be used.

A pair of plate receiving dowel pins 35-1 and 35-2 are fixedly mounted on the inner angular portion 21 of frame 17 for use in fixing the angular position of disc assembly 15 on base assembly 13 in a manner as will hereinafter be explained. A plurality of indexing pins labelled 37-1 through 37-24 are fixedly mounted on the outer annular portion 23 of frame 17 for use in precisely positioning the openings 31 as frame 17 is rotated, each pin 37 being associated with and precisely located relative to one of the openings 31.

Figure 5:
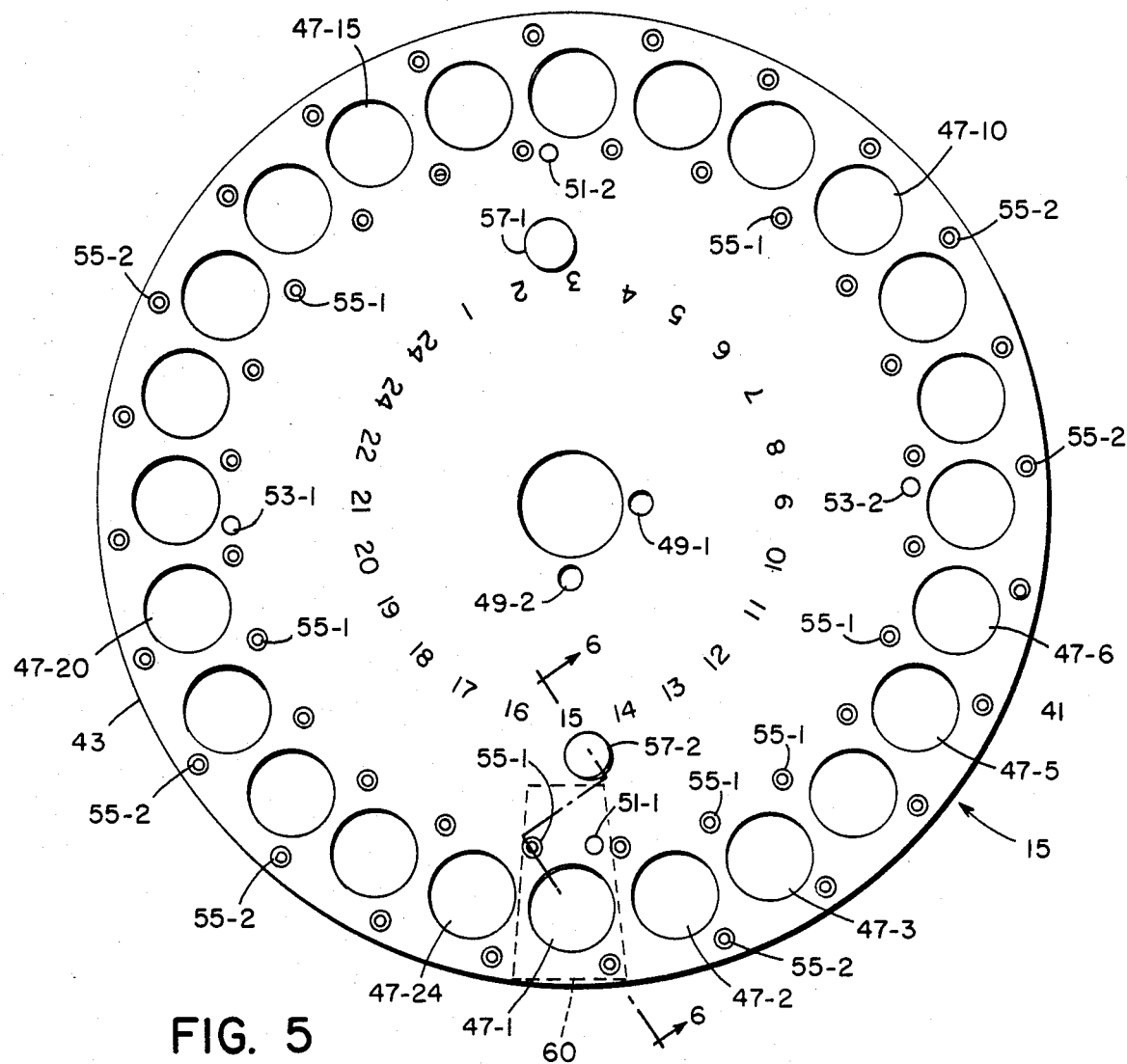
FIG. 5 is a plan view of the disc assembly in the aperture wheel shown in FIG. 1 and slightly enlarged.
Figure 6:
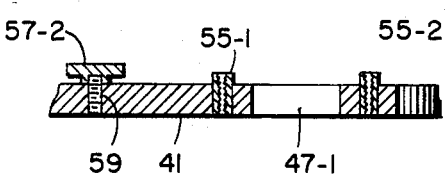
FIG. 6 is a section view of the disc assembly taken along lines 6—6 in FIG. 5.

Disc assembly 15, which is also shown in FIGS. 5, 6 and 7 includes a relatively thin, flat circular plate or disc 41 made of aluminum or other suitable material. Disc 41 is provided with a central aperture 43 which is sized so that it will snugly fit over bushing 29 on base assembly 13 and is removably mounted on base assembly 13. As can be seen in FIG. 2, disc 41 snugly seats on the top surface 42 of inner annular portion 21 of base assembly 13 such that its peripheral surface 43 mates with the inner peripheral surface 45 of outer annular portion 23 of base assembly 13.

Disc 41 is provided with a plurality of circumaxially spaced openings corresponding in number to the openings on frame 17 and labelled 47-1 through 47-24. Openings 47 are located on disc 41 such that they can be brought into registration with openings 31 on frame 17 by rotating disc 41 relative to frame 17 and are preferably the same size or less than the size of openings 31. Disc 41 is also provided with a pair of locating holes 49-1 and 49-2 which are located such that each individual hole may be brought into registration with locating hole 33 on frame member 17 at two different annular positions of disc 41 on frame 17. Disc 41 is further provided with two sets of mounting holes, one set of holes being labelled 51-1 and 51-2 and the other set being labelled 53-1 and 53-2. Mounting holes 51 and 53 are used in combination with dowel pins 35-1 and 35-2 to fixedly secure disc 41 on frame 17 in either one of two angular positions, the two angular positions being angularly spaced from one another by ninety degrees. In FIG. 1, the dowel pins 35 are shown extending through mounting holes 51-1 and 51-2 so disc 41 is angularly fixed relative to frame 17 at one particular position. By rotating disc 41 ninety degrees (in either direction) relative to frame 17, dowel pins 35 will extend through mounting holes 53-1 and 53-2, fixing thereby disc 41 or frame 17 at the record angular position.

A pair of internally threaded dowel pins 55-1 and 55-2 are fixedly mounted on disc 41 adjacent to each opening 47. Dowel pins 55 are used as mounting pins on which may be mounted and secured an aperture plate and/or a filter plate and are precisely positioned relative to openings 47 so that an aperture plate and/or filter plate mounted thereon will be accurately aligned over the center of the opening. Finally, a pair of knobs or handles 57-1 and 57-2 are mounted on disc 41 for use in placing disc 41 on frame 17 and lifting disc 41 off of frame 17. Knobs 57 are secured to disc 41 by flat head screws 59-1 and 59-2 which extend up from the bottom of disc 41 though counter sunk holes 61-1 and 61-2 and engage the internal threads in knobs 57.

Frame 17 is made from a solid body of material which is precisely machined to the necessary shape and size for use in the particular machine in which it is to be placed (as shown especially in FIG. 2) and is drilled at the precise location required to form openings 31 and the holes for the indexing pins 37. Disc 41 is made from a flat sheet of stock which is cut to the desired size and then drilled to form the various holes.

As can be appreciated, the cost and time in fabricating disc 41 is considerably less than the cost and time in fabricating frame 17.

In using aperture wheel 11, the aperture plates and/or filter plates needed for a particular job are first mounted on disc 41. After the aperture plates and/or filter plates are mounted on the disc 41 and secured in place, disc 41 is mounted on frame 17 at the proper angular position. Aperture wheel 11 is then ready for use. A view of a portion of aperture wheel 11 with aperture plates and/or filter plates mounted over some of the openings 47 is shown in FIG. 7. As can be seen, an aperture plate 60 is mounted over opening 47-1, an aperture plate 61 and a filter plate 62 are both mounted over opening 47-3 and a filter plate 63 is mounted over opening 47-2. Aperture plate 60 is secured in place by ring shaped fasteners 65 (see FIG. 8) which fit over downel pins 55-1 and 55-2. Aperture plate 61 and filter 62 are both secured in place by screws 67 (see FIG. 9) which are screwed into dowel pins 55-1 and 55-2 and filter plate 63 is secured in place by screws 67 which are screwed into dowel pins 55-1 and 55-2.

As can be appreciated, the invention may advantageously be practiced by providing a single base assembly 13 and a plurality of disc assemblies 15. Each disc assembly 15 is loaded with a plurality of aperture places and/or filter plates, the particular aperture plates and/or filter plates in each disc assembly and the order in which they are positioned on the disc assembly depending on the requirements of the particular job. In use, a disc assembly having the aperture plates and/or filter plates for one job is mounted on the disc assembly. After the job is completed the disc assembly is removed and replaced with a disc assembly having the aperture plates and/or filter plates for the next job.

It is to be understood that although the invention has been described generally for use with a photoplotting machine it is not intended to be limited in use solely to that application. The invention may be employed in any machine or system in which a plurality of aperture plates and/or filter plates are used.

The embodiment of the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. An aperture wheel for use in selectively varying the characteristics of a beam of light, said aperture wheel comprising:
   a. a circular frame adapted to be supported for rotation about its central axis, said frame having a plurality of circumaxially spaced openings,
   b. a plurality of indexing pins mounted on said frame for use in indexing the angular position of said frame, each pin being associated with and precisely located with respect to one of said openings,
   c. a circular disc seated on said frame member in axial alignment therewith said disc having a plurality of circumaxially spaced openings, said openings being positioned thereon so that they may be brought into registration with said circumaxially spaced openings on said frame.
   d. means for fixing the angular position of said disc relative to said frame, and
   e. means on said disc for use in mounting thereon a plurality of aperture plates, one over each of said circumaxially spaced openings.

2. The aperture wheel of claim 1 and wherein said frame has a central aperture, an inner annular portion and an outer annular portion and wherein said circumaxially spaced openings on said frame are located on said inner annular portion.

3. The aperture wheel of claim 2 and wherein said plurality of indexing pins on said frame are mounted on said outer annular portion.

4. The aperture wheel of claim 3 and wherein the top surface of the outer annular portion of said frame is raised relative to the top surface of the inner annular portion of said frame.

5. The aperture wheel of claim 4 and wherein said disc is seated on the inner annular portion of said frame with the inner peripheral surface of the outer annular portion of said frame mating with the peripheral surface of said disc.

6. The aperture wheel of claim 5 and wherein said pins on said outer annular portion of said frame are dowel pins.

7. The aperture wheel of claim 5 and wherein said circumaxially spaced openings on said frame are sized at least as large as the circumaxially spaced openings on said disc.

8. The aperture wheel of claim 7 and wherein said means for fixing the angular position of said disc on said frame comprises a pair of disc positioning pins fixedly mounted on said inner annular portion of said frame and a plurality of disc positioning holes on said disc.

9. The aperture wheel of claim 8 and wherein said plurality of holes on said disc comprises four holes, whereby said disc may be fixed on said frame at either one of two annular positions.

10. The aperture wheel of claim 9 and wherein said means for use in mounting said aperture plates on said disc comprises a pair of aperture plate mounting pins fixedly mounted about each one of said circumaxially spaced openings in said disc.

11. The aperture wheel of claim 10 and further including means adapted to fixedly secure said aperture defining plates on said mounting pins over said circumaxially spaced openings.

12. The aperture wheel of claim 11 and further including handle means on said disc for use in placing said disc on said frame and lifting said disc off of said base member.

13. The aperture wheel of claim 12 and wherein said means for fixedly securing said aperture defining plates on said disk comprises fasteners adapted to be mounted on said aperture plate mounting pins on said disc.

14. The aperture wheel of claim 13 and wherein said frame and said disc are both made of metal.

15. The aperture wheel of claim 14 and wherein the thickness of the disc is less than the thickness of the frame.

16. The aperture wheel of claim 15 and further including a plurality of aperture plates, each adapted to be mounted on said disc over one of said circumaxially spaced openings.

17. The aperture wheel of claim 16 and wherein said disc has a central aperture.

18. An aperture wheel for use in a photoplotting machine, said aperture wheel comprising:
   a. a frame of generally circular configuration adapted to be supported for rotation about its central axis and having a central aperture, an inner annular portion, an outer annular portion, the top surface of the outer annular portion being raised relative to the top surface of the inner annular portion and a plurality of circumaxially spaced openings on said inner annular portion,
   b. a plurality of indexing pins fixedly mounted on said outer annular portion of said base member for use in indexing the angular position of said frame, on pin associated with each one of said circumaxially spaced openings.
   c. a disc removably disposed on the inner annular portion of said frame in axial alignment with said frame, said disc having a central aperture, a plurality of circumaxially spaced openings located on said disc so that they can be brought into registration with said circumaxially spaced openings on said frame on rotational movement of said disc relative to said base member, a peripheral surface adapted to mate with the inner peripheral surface of the outer annular portion on the frame, a plurality of angular positioning holes for use in fixing the angular position of said disc on said frame.
   d. a pair of pins fixedly mounted on said inner annular portion of said frame for use in a pair of angular positioning holes on said disc fixing the angular position of said disc on said frame, and
   e. a pair of aperture defining plate mounting pins fixedly mounted on said disc around each one of said circumaxially spaced openings.

19. The aperture wheel of claim 18 and further including a plurality of aperture defining plates, each removably secured over a respective one of said circumaxially spaced openings.

20. An aperture wheel comprising:
   a. a base assembly adapted to be mounted for rotation about its central axis and including indexing means for indexing its angular position, and
   b. a disc assembly removably mounted on said base assembly and including means for mounting thereon a plurality of aperture plates in circumaxially spaced relationship and means for fixing the angular position of said disc assembly relative to said base assembly.

* * * * *